Jan. 5, 1960　　　O. F. BAUER ET AL　　2,919,518
MACHINE FOR LAPPING OR BURNISHING
GEARS, OR LIKE OPERATIONS
Filed March 6, 1957　　　　　　　　　　　3 Sheets-Sheet 1
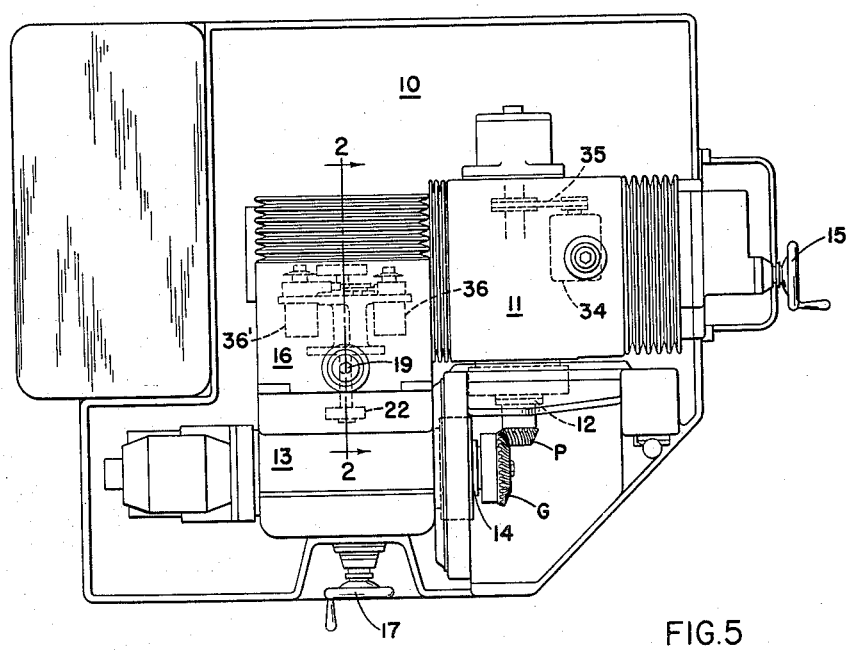
FIG. 1
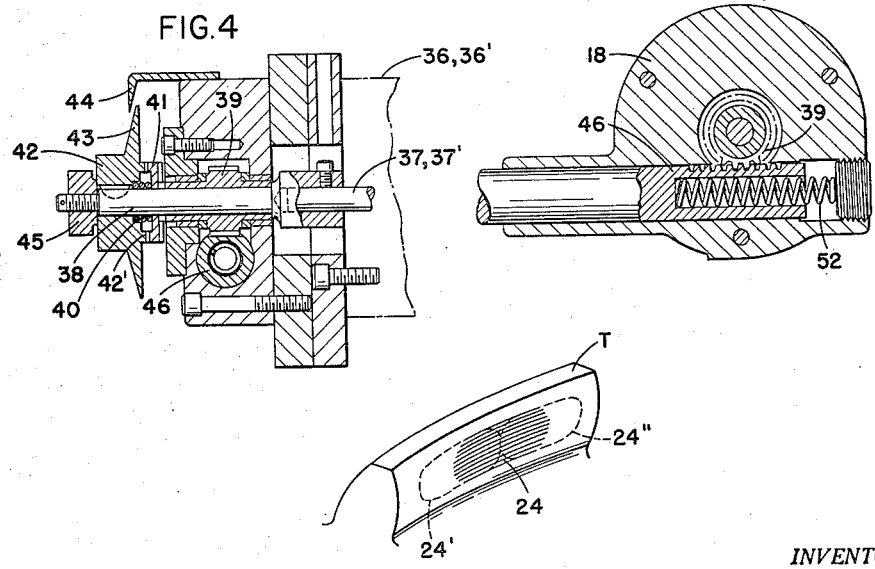
FIG. 4　　FIG. 5
FIG. 6
INVENTORS
OLIVER F. BAUER
EARL D. DAMMERT
BY Richard W. Treverton
ATTORNEY

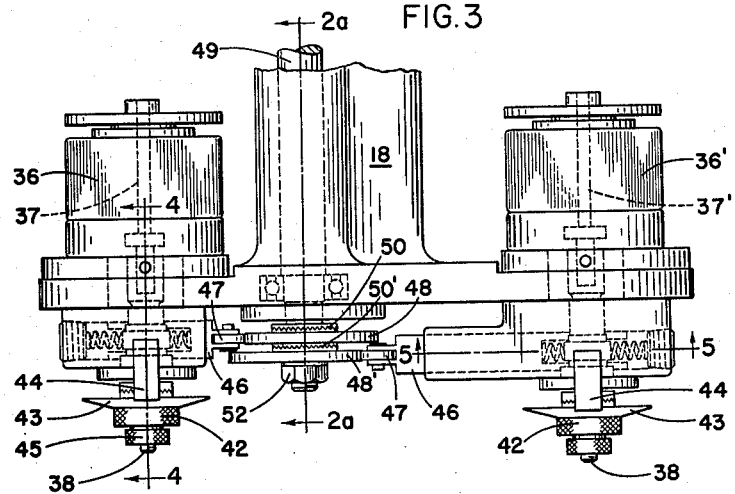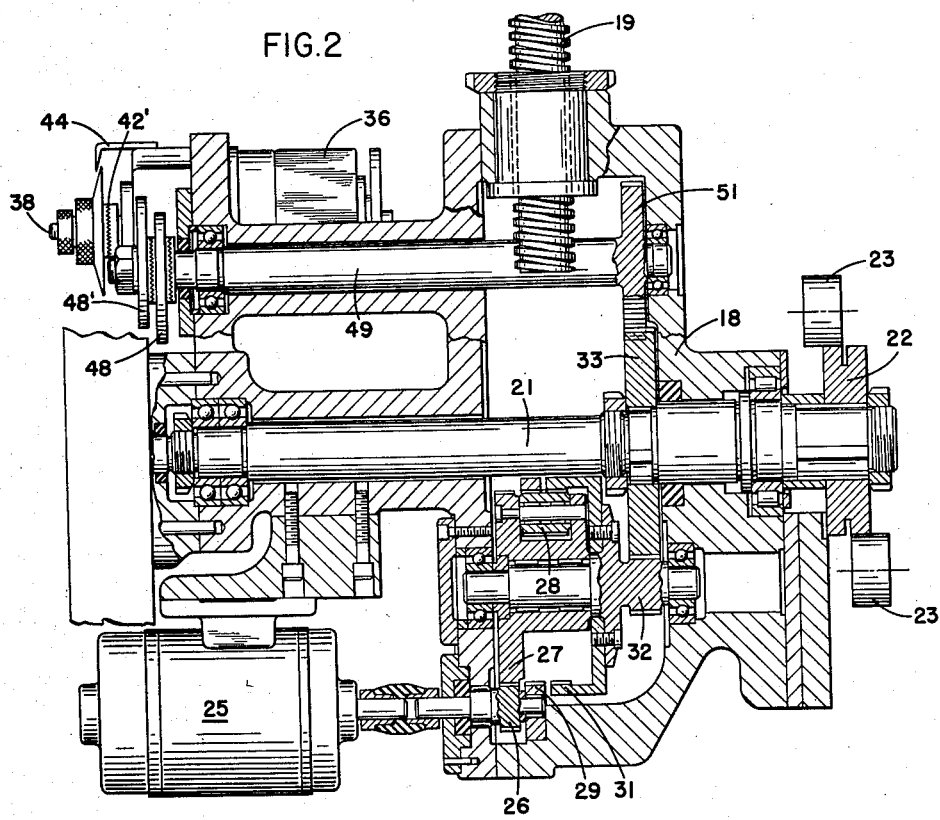

Jan. 5, 1960   O. F. BAUER ET AL   2,919,518
MACHINE FOR LAPPING OR BURNISHING
GEARS, OR LIKE OPERATIONS
Filed March 6, 1957   3 Sheets-Sheet 3
FIG. 7
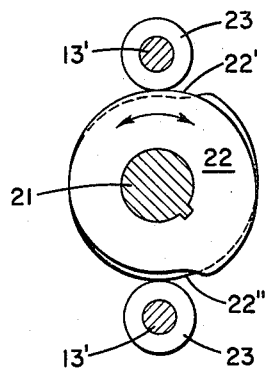
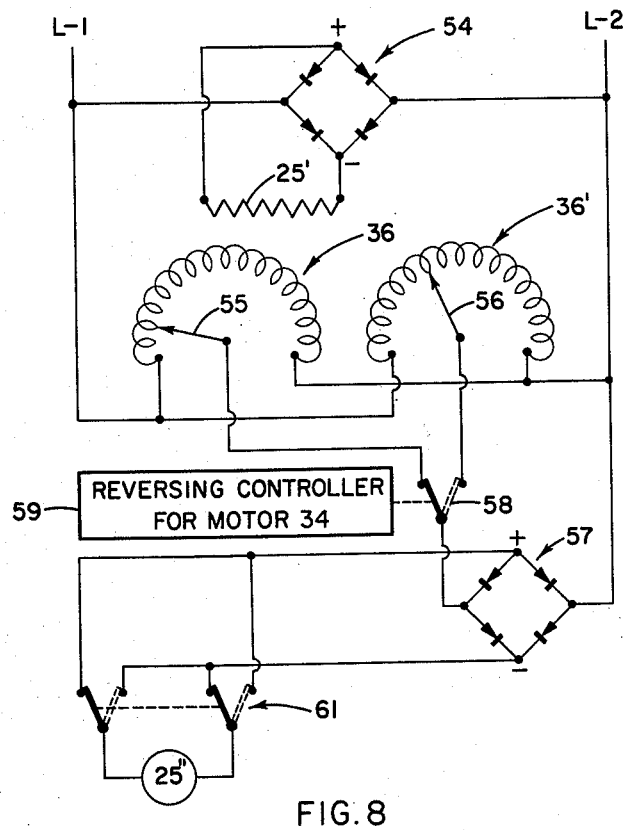
FIG. 8
INVENTORS
OLIVER F. BAUER
EARL D. DAMMERT
BY
Richard W. Treverton
ATTORNEY

United States Patent Office 2,919,518
Patented Jan. 5, 1960

2,919,518

MACHINE FOR LAPPING OR BURNISHING GEARS, OR LIKE OPERATIONS

Oliver F. Bauer, Rochester, and Earl D. Dammert, Webster, N.Y., assignors to The Gleason Works, Rochester, N.Y., a corporation of New York Application March 6, 1957, Serial No. 644,296

8 Claims. (Cl. 51—26)

The present invention relates to a machine for running together a pair of gears for lapping or burnishing them, or for like operations.

Such a machine usually comprises two spindles for supporting the gears that are to be run together, a motor drive for at least one of the spindles, and a second motor drive for effecting a cyclical relative motion between the spindles to thereby change the positional relationship of the gears as they run together. The effect of such change in relationship is to shift the position of the tooth bearing. The relative motion of the spindles is usually effected by a cam operated by the second motor, and it is known to vary the shape of such a cam to control the amount of lapping or burnishing in different positions of the tooth bearing, for example to lap or burnish longer at one or both ends of the teeth than at the centers of the teeth. But in order to vary the magnitude of relative motion of the spindles to accommodate gears of different design, it is desirable to vary the angle through which the cam is oscillated, and this precludes making the cam of a special shape to control the amount of lapping or burnishing in different positions of the tooth bearing. The object of the invention is to attain such control while at the same time retaining the feature of varying the magnitude of the relative motion of the spindles by changing the angle of cam oscillation.

A machine according to the invention comprises two spindles for supporting gears that are to be run in mesh with each other, a motor for driving at least one of said spindles, a reversing motor and a mechanism driven by said reversing motor alternately in opposite directions for effecting a cyclical relative motion between said spindles to thereby change the positional relationship of the gears as they run together, at least one of said motors being of the variable speed type, speed control means for said one of said motors, and a connection between said mechanism and the speed control means for causing the latter to vary the speed of the last-mentioned motor in predetermined phase relation to the cyclical relative motion between said spindles.

A preferred embodiment of the invention is shown in the accompanying drawings, wherein:

Fig. 1 is a plan view of the machine;

Fig. 2 is a detail vertical section approximately in the planes indicated at 2—2 in Fig. 1 and at 2a—2a in Fig. 3;

Fig. 3 is a fragmentary plan view of the structure shown in Fig. 2 and also, in dotted lines, in Fig. 1.

Figs. 4 and 5 are detail vertical sections respectively in planes 4—4 and 5—5 of Fig. 3;

Fig. 6 is a schematic view of a gear tooth illustrating the shifting of tooth bearing which occurs during operation of the machine;

Fig. 7 is a diagrammatic vertical section illustrating a cam and cam followers which appear in Fig. 2; and, Fig. 8 is a wiring diagram.

The illustrated machine is basically like that shown in U.S. Patent 2,639,557, granted May 26, 1953, to F. E. McMullen and T. H. Peck, and includes a frame 10, a head 11 on the frame journaling a spindle 12 for supporting the pinion P, or smaller member of a pair of bevel or hypoid gears to be lapped, and a head 13 supporting a spindle 14 for the gear G, or larger member of the pair. The pinion head 11 is adjustable in the direction of the gear axis, i.e. horizontally in Fig. 1, by turning a handwheel 15. The gear spindle is journaled in a spindle housing, not shown, which is movable in head 13 both laterally and longitudinally, i.e. both vertically and horizontally in the plane of Fig. 1. The head 13 is movable vertically on a column 16, i.e. perpendicular to the plane of Fig. 1. Column 16 is adjustable in the direction of the pinion axis by means of a handwheel 17.

A cam bracket 18, Figs. 2 and 3, is adjustable vertically in the column 16 by means of an adjusting screw 19. Journaled in this bracket is a shaft 21 carrying a cam 22 which is confined between a pair of follower rollers 23 carried by the head 13, being rotatable on stub shafts 13', Fig. 7, rigid with the head. The surface 22' of the cam that engages the upper roller is a spiral of constantly increasing radius, while the surface 22" thereof engaging the lower roller of a similar spiral of opposite hand. The rate of radius increase of the surfaces 22' and 22", i.e. the throw of the cam, is shown greatly exaggerated in Fig. 7. By turning the adjusting screw 19 the head 13 may be raised or lowered, and, by reason of the confinement of cam 22 between rollers 23, the spindle 14 and its housing move as a unit with head 13 during such adjustment. By this adjustment provided by screw 19, and those effected by turning handwheels 15 and 17, the spindles 12 and 14 may be positioned to accommodate bevel or hypoid gears of varying size and tooth number ratio.

Because of its spiral form, oscillation of the cam 22 back and forth about the axis of shaft 21 raises and lowers the rollers 23 and spindle 14 relative to the spindle 12, and, through a linkage system described in aforementioned Patent 2,639,557, may also and at the same time effect longitudinal and lateral reciprocations of the spindle 14 and its housing, i.e. reciprocations along and perpendicular to the axis of the gear spindle. The combined result of these several relative motions between the gear and pinion, which occur while the gears are rotating, is to shift the tooth bearing shown by shaded area 24 in Fig. 6 to different positions along the gear tooth T, as for example between the two positions indicated by dotted lines 24' and 24". The cam 22 thus constitutes a mechanism which may be driven alternately in opposite directions for effecting a cyclical relative motion between the spindles 12 and 14 to thereby change the positional relationship of the gears P and G as they run together.

The shaft 21 is oscillated by means of a reversible electric motor 25, Fig. 2, through high reduction gearing. This gearing comprises a pinion 26, a gear 27, a planet pinion 28 which is carried by gear 27 and meshes with a fixed internal gear 29 and also with a rotatable internal gear 31, a pinion 32 co-rotatable with gear 31, and a gear 33 fixed to shaft 21. A very high speed reduction results from the gears 29 and 31 having tooth numbers differing from each other only by one. Just as in the machines disclosed in McMullen et al. Patent 2,639,557, and in prior Patent 2,445,649 to L. H. Turner et al. referred to in the McMullen et. al. patent, the cam-oscillating motor which here is designated 25 is a direct current motor whose speed is adjustable by means of two rheostats, one of which controls the motor speed when the gears G and P are being rotated in one direction and the other of which controls the motor speed when the gears are being rotated in the opposite direction. By means of such control devices the time required for each oscillation of the cam 22 can be varied. At least one of the gear spindles, preferably the pinion spindle 12, is driven by a reversible motor 34 located in the frame 10 and connected to the spindle by a pulley and belt drive 35. One side of the teeth of the gears P and G are lapped or burnished by operating the motor in a forward direction. After this operation is completed the motor 34 is reversed to lap or burnish the other side of the teeth. Also as in the aforementioned Patents 2,445,649 and 2,639,557, the two current control devices for the cam-oscillating motor, here motor 25, are so connected electrically with the control means for spindle drive motor 34 that one of them functions to control the speed of motor 25 when motor 34 is in forward operation and that the other of them so functions when motor 34 is in reverse operation.

While according to the invention the amount of lapping or burnishing which takes place in different positions of the gears can be changed by varying the speed of the spindle drive motor 34, we prefer to leave this speed constant throughout the lapping or burnishing operation, and to effect the change by varying the speed of the motor 25. This is accomplished by means, now to be described, associated with the aforementioned current control devices which in the illustrated embodiment comprise two identical variable voltage autotransformers 36 and 36'. These are so arranged in circuit with motors 25 and 34 that autotransformer 36 controls the speed of motor 25 when motor 34 is running forwardly and that autotransformer 36' controls the speed of motor 25 when motor 34 is running reversely. The autotransformers are mounted on the bracket 18 and have rotatable shafts, respectively 37 and 37' which are turned in one direction to increase their output voltage and in the opposite direction to decrease it. Secured to each shaft 37, 37' is an extension shaft 38, Figs. 3 and 4, upon which is rotatably mounted a pinion 39 keyed to a face toothed clutch member 41. The latter is engaged with mating clutch teeth 42' on a knob 42 which is keyed to extension shaft 38 and has a calibrated rim 43 which may be read against a pointer 44 carried by bracket 18. A knurled nut 45 screw-threaded to each extension shaft holds the knob 42 engaged with clutch 41 against the resistance of a compression spring 40. Upon loosening the nut the spring disengages the clutch to permit adjustment of the autotransformer shaft 37 or 37' with respect to the related pinion 39.

Each pinion 39 meshes with a rack 46 which is supported for reciprocation in the bracket 18. On each rack is a roller 47 engaged with a cam, 48 or 48', secured to a shaft 49 which is journaled for rotation in the bracket. Affixed to the shaft is a gear 51 meshing with the gear 33 on shaft 21. A spring 52, Fig. 5, acts on each rack to hold its roller 47 on the related cam 48 or 48', with the result that as the cam oscillates, the rack will be reciprocated and, acting through the pinion 39, will oscillate the autotransformer shaft to vary the voltage applied to motor 25. Cam 48 has fine pitch face clutch teeth 50 engaged with mating teeth on a flange on shaft 49, and cam 48' has similar clutch teeth 50' engaging mating teeth on cam 48. Accordingly upon first loosening a nut 52 which holds the cams on shaft 49, the cams may be adjusted, independently, to various angular positions relative to the shaft. In this way it is possible to adjust the voltage applied to the motor in any given position of the cams 48 and 48'.

In using the machine the spindle drive motor 34 may be operated first in a forward direction, with the autotransformer 36 controlling motor 25. During this part of the operation the motor 25 is operated alternately in opposite directions through one or more cycles, and during each cycle rocks the cam 22 first in one direction, from a neutral position to a limit position and return, and then to an opposite limit position and return to neutral position. During each such cycle the tooth bearing may shift from the position shown in full lines at 24 in Fig. 6 to the dotted line position 24' and return, and to dotted line position 24" and return to the full line position. The cam 48 may be of whatever shape is needed to run the gears together for the desired time in each relative position which they assume during the cycle. For example, the cam may be shaped to so rotate the autotransformer shaft 37 that a higher voltage will be delivered to the motor 25 when the tooth bearing is in position 24, and lower voltages when it is in positions 24' and 24", causing the motor to run fast in position 24 and to run slower as positions 24' and 24" are approached. Thus proportionably larger parts of the lapping cycle will be devoted to lapping or burnishing the ends of the teeth than to their middle zones. After the desired number of cycles of oscillation of cam 22, the spindle drive motor 34 is reversed to effect lapping or burnishing of the opposite sides of the teeth. During this part of the operation the cam 48' and autotransformer 36' control the speed of motor 25.

By adjusting the cams 48 and 48' angularly on shaft 49, and by adjusting the phase relation between these cams and the autotransformers they respectively control, it is possible to vary the areas of the tooth surfaces which are subjected to the greatest and the least lapping or burnishing. For example the area subjected to least lapping or burnishing can be shifted from the middle to either end of the tooth. Thus one pair of cams 48, 48' can serve for gears of different design or which have different lapping or burnishing characteristics. However these cams are readily replaced, and preferably the machine is provided with a series of interchangeable cams, differing from one another as to the rate and the maximum amount of angular motion they will impart to autotransformer shafts 37, 37'. Cams 48, 48' may also be made of special shape to meet the requirements of particular gears; they may be so shaped as to gradually change the voltage applied to motor 25 throughout the cycle of oscillation of cam 22 or so as to suddenly change such voltage at particular points in the cycle.

The particular electric circuits employed to control the spindle drive motor and the cam oscillating motor are not a part of our invention and hence, except for the portion thereof shown in Fig. 8, the same have not been described herein in detail. However, if desired, the circuits may be similar to those disclosed in the aforementioned Patent 2,639,557. Fig. 8 is a simplified wiring diagram showing schematically one way in which the reversing controller for motor 34 may be connected to the speed controllers for the cam-oscillating motor 25, here shown as comprising the autotransformers 36, 36'. The field winding 25' of motor 25 is energized by direct current from a rectifier unit 54 which is connected across leads L–1 and L–2 of a suitable source of alternating current. The autotransformers 36 and 36' are connected in parallel across the leads L–1 and L–2 and their adjustable secondary current contacts, 55 and 56 respectively, are alternately connected to one alternating current connection of a rectifier unit 57 by a two position switch 58 operated by the reversing controller 59 for motor 34. The other alternating current connection of the rectifier unit 57 is to lead L–2. The direct current connections from the unit 57 are through a reversing switch 61 to the armature windings 25" of motor 25. Switch 61 is reversed to terminate each stroke of the oscillating motion, by a suitable means, not shown, connected to oscillating shaft 21. During operation of the system, when the motor 34 is operated forwardly by its controller 59 the switch 58 is in its full line position so that the armature of motor 25 is energized by rectified secondary current from autotransformer 36; and when motor 34 is operated reversely switch 58 is in its dotted line position and hence the current for armature 25 is provided by the other autotransformer, 36'.

Having now described the preferred machine embodi- ment and the operation thereof, what we claim as our invention is:

1. A machine for lapping or burnishing gears, or for like operations, having two spindles for supporting gears that are to be run in mesh with each other, a motor for driving at least one of said spindles, a reversing motor and a mechanism driven by said reversing motor alternately in opposite directions for effecting a cyclical relative motion between said spindles to thereby change the positional relationship of the gears as they run together, at least one of said motors being of the variable speed type, speed control means for said one of said motors, and a connection between said mechanism and the speed control means for causing the latter to vary the speed of the last-mentioned motor in predetermined phase relation to the cyclical relative motion between said spindles.

2. A machine according to claim 1 in which said speed control means comprises a device to control the current supplied to said one of said motors, and said connection comprises a drive from said reversing motor for operating said device to different current control positions thereof.

3. A machine according to claim 2 in which said drive for operating the control device comprises a cam oscillated by said reversing motor.

4. A machine according to claim 3 in which the cam is adjustable angularly to thereby vary its phase relationship to said mechanism driven by said reversing motor.

5. A machine for lapping or burnishing gears, or for like operations, having two spindles for supporting gears that are to be run in mesh with each other, a first motor for driving one of the spindles and adapted for both forward and reverse operation, mechanism including a second reversing motor for effecting a cyclical relative motion between said spindles to thereby vary the positional relationship of the gears as they run together, two separate control means for governing the speed of the second motor, said two means being effective respectively during forward and reverse operation of the first motor, and a connection between said mechanism and said control means for causing the latter to change the speed of the second motor during the cycle of said relative motion between said spindles.

6. A machine according to claim 5 in which each of said two control means comprises a device to vary the current supplied to the motor, and said connection comprises a separate operating cam for each device, the cams being arranged for oscillation by the second motor.

7. A machine according to claim 6 in which said cams are independently adjustable in phase with respect to said mechanism for effecting a cyclical relative motion between the spindles.

8. A machine according to claim 7 in which there is a separate means for adjusting the phase relation between each of said devices and its actuating cam.

References Cited in the file of this patent

UNITED STATES PATENTS 2,445,649    Turner et al. _____ July 20, 1948